US010664847B2

(12) United States Patent
Varghese et al.

(10) Patent No.: US 10,664,847 B2
(45) Date of Patent: *May 26, 2020

(54) PREDICTIVE MODELING FOR EVENT DELIVERY BASED ON REAL-TIME DATA

(71) Applicant: Bank of America Corporation, Charlotte, NC (US)

(72) Inventors: Susan Varghese, Atlanta, GA (US); William August Stahlhut, The Colony, TX (US); Mohamed A. Gahnoog, Charlotte, NC (US); Katherine Dintenfass, Lincoln, RI (US); Minh N. Vuong, San Jose, CA (US); Cameron Darnell Wadley, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/726,895

(22) Filed: Oct. 6, 2017

(65) Prior Publication Data
US 2019/0108530 A1 Apr. 11, 2019

(51) Int. Cl.
| | | |
|---|---|---|
| H04L 29/08 | (2006.01) |
| G06N 99/00 | (2019.01) |
| G06Q 20/42 | (2012.01) |
| G06Q 30/06 | (2012.01) |
| G06N 20/00 | (2019.01) |
| G06Q 20/10 | (2012.01) |
| G06Q 20/12 | (2012.01) |

(52) U.S. Cl.
CPC ............ *G06Q 20/42* (2013.01); *G06N 20/00* (2019.01); *G06Q 20/10* (2013.01); *G06Q 20/12* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 7,143,064 | B2 | 11/2006 | Picciallo et al. |
| 7,653,595 | B2 | 1/2010 | Picciallo et al. |
| 8,127,982 | B1 | 3/2012 | Casey et al. |
| 8,145,573 | B2 | 3/2012 | Hill |
| 8,290,866 | B1 | 10/2012 | Little |

(Continued)

*Primary Examiner* — Natisha D Cox
(74) *Attorney, Agent, or Firm* — Banner & Witcoff, Ltd.; Michael A. Springs (57) ABSTRACT

Aspects of the disclosure relate to implementing and using a data processing system to provide real-time data to improve event delivery timing. A computing platform may establish respective connections with and receive, via a communication interface, (i) from a subordinate user computing device, information defining a first event; (ii) from a supervisory user computing device, supervisory information associated with the first event; and (iii) from a first participant computing device, first participant information associated with delivery of the first event. The computing platform may execute an algorithm for comparing the information defining the first event, the supervisory information, and the first participant information, and generating a formatted alert based thereon. The formatted alert may be transmitted for display on the subordinate user computing device and/or the supervisory user computing device.

20 Claims, 7 Drawing Sheets

(56) References Cited

U.S. PATENT DOCUMENTS

| | | |
|---|---|---|
| 8,459,544 B2 | 6/2013 | Casey et al. |
| 8,571,986 B2 | 10/2013 | Dooley Maley et al. |
| 8,583,554 B2 | 11/2013 | Dooley Maley et al. |
| 9,075,868 B2 | 7/2015 | Mehanna et al. |
| 9,519,932 B2 | 12/2016 | Calman et al. |
| 9,524,524 B2 | 12/2016 | Calman et al. |
| 9,684,905 B1 | 6/2017 | Haller et al. |
| 2013/0018792 A1* | 1/2013 | Casey .................. G06Q 40/02 705/44 |
| 2013/0110670 A1* | 5/2013 | Webber ................ G06Q 30/06 705/26.8 |
| 2013/0185206 A1* | 7/2013 | Leggett ................ G06Q 20/32 705/44 |
| 2013/0346235 A1* | 12/2013 | Lam .................... G06Q 30/0633 705/26.8 |
| 2015/0220979 A1* | 8/2015 | Ouimet .............. G06Q 30/0251 705/14.49 |
| 2015/0324881 A1* | 11/2015 | Ouimet ................ G06Q 30/02 705/14.49 |
| 2015/0324882 A1* | 11/2015 | Ouimet .............. G06Q 30/0633 705/26.41 |
| 2015/0379601 A1* | 12/2015 | Ouimet .............. G06Q 30/0613 705/26.41 |
| 2016/0127379 A1* | 5/2016 | Nayshtut ............... G06F 21/554 726/1 |
| 2016/0350846 A1 | 12/2016 | Dintenfass et al. |
| 2017/0161806 A1* | 6/2017 | Pearson ................ G06Q 30/06 |
| 2018/0108054 A1* | 4/2018 | Doubinski ......... G06Q 30/0283 |
| 2019/0066188 A1* | 2/2019 | Rothschild ........... G07G 1/0009 |

\* cited by examiner

PREDICTIVE MODELING FOR EVENT DELIVERY BASED ON REAL-TIME DATA

BACKGROUND

Aspects of the disclosure relate to electrical computers, data processing systems, and machine learning. In particular, one or more aspects of the disclosure relate to implementing and using a platform that receives and processes customizable supervisory parameters along with real-time event delivery data to optimize event delivery.

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure provide techniques for enabling interactive and customizable controls for a supervisory user with respect to a subordinate user's interactions with a computing platform.

In accordance with one or more embodiments, a computing platform having at least one processor, a memory, and a communication interface may establish, via the communication interface, a first connection to a subordinate user computing device. While the first connection is established, the computing platform may receive, via the communication interface, from the subordinate user computing device, information defining a first event. The computing platform may establish, via the communication interface, a second connection to a supervisory user computing device. While the second connection is established, the computing platform may receive, via the communication interface, from the supervisory user computing device, supervisory information associated with the first event. The computing platform may establish, via the communication interface, a third connection to a first participant computing device. While the third connection is established, the computing platform may receive, via the communication interface, from the first participant computing device, first participant information associated with delivery of the first event. The computing platform may execute an algorithm for comparing the information defining the first event, the supervisory information, and the first participant information, and generating a formatted alert based thereon. The computing platform may transmit the formatted alert to the subordinate user computing device and/or the supervisory user computing device. When executed by the subordinate user computing device and/or the supervisory user computing device, the formatted alert causes a notification to be displayed on the subordinate user computing device and/or the supervisory user computing device.

In some embodiments, the computing platform may establish, via the communication interface, a fourth connection to an administrative computing device. While the fourth connection is established, the computing platform may receive, via the communication interface, from the administrative computing device, administrative information associated with the first event. The algorithm, when executed, may cause the computing platform to compare the information defining the first event, the supervisory information, the first participant information, and the administrative information.

In some embodiments, the computing platform may establish, via the communication interface, a fourth connection to a social media computing device. While the fourth connection is established, the computing platform may receive, via the communication interface, from the social media computing device, subordinate user segment trends associated with the first event. The algorithm, when executed, may cause the computing platform to compare the information defining the first event, the supervisory information, the first participant information, and the subordinate user segment trends.

In some embodiments, the computing platform may, responsive to receiving the information defining the first event, based on a machine learning dataset, modify the algorithm for comparing the information defining the first event, the supervisory information, and the first participant information. The algorithm may be modified, for example, based on historical information received from the subordinate user computing device or based on information received from a plurality of subordinate user computing devices.

In some embodiments, the computing platform may determine whether the information defining the first event, the supervisory information, and the first participant information satisfy predetermined automatic delivery criteria. Upon the information defining the first event, the supervisory information, and the first participant information satisfying the predetermined automatic delivery criteria, the computing platform may automatically transmit a delivery instruction to the first participant computing device.

In accordance with one or more additional embodiments, a computing platform having at least one processor, a memory, and a communication interface may establish, via the communication interface, first connections to a collection of subordinate user computing devices. While the first connections are established, the computing platform may receive, via the communication interface, from the collection of subordinate user computing devices, information defining a first event. The computing platform may establish, via the communication interface, second connections to a collection of supervisory user computing devices. While the second connections are established, the computing platform may receive, via the communication interface, from the collection of supervisory user computing devices, supervisory information associated with the first event. The computing platform may establish, via the communication interface, a third connection to a first participant computing device. While the third connection is established, the computing platform may receive, via the communication interface, from the first participant computing device, first participant information associated with delivery of the first event. The computing platform may execute an algorithm for aggregating the information defining the first event and the supervisory information, and generating a formatted alert based thereon. The computing platform may transmit the formatted alert to the first participant computing device. When executed by the first participant computing device, the formatted alert causes a notification to be displayed on the first participant computing device.

In some embodiments, the computing platform may compare the aggregated information defining the first event and the supervisory information with the first participant information. The formatted alert may include information with respect to the comparison.

In some embodiments, the computing platform may, responsive to receiving the information defining the first event, based on a machine learning dataset, modify the algorithm for aggregating the information defining the first event and the supervisory information. The algorithm may be modified, for example, based on information received from a plurality of subordinate user computing devices.

In some embodiments, the computing platform may, responsive to receiving the information defining the first event, based on a machine learning dataset, aggregate the information defining the first event and the supervisory information to define information indicative of a temporal proximity to delivery of the first event. The formatted alert may include the temporal proximity information.

In some embodiments, the computing platform may compare the first participant information with predetermined automatic delivery criteria. Upon the first participant information satisfying the predetermined automatic delivery criteria, the computing platform may automatically transmit a delivery instruction to the first participant computing device.

In some embodiments, the computing platform may establish, via the communication interface, a fourth connection to an administrative computing device. While the fourth connection is established, the computing platform may receive, via the communication interface, from the administrative computing device, administrative information associated with the first event. The algorithm, when executed, may cause the computing platform to compare the information defining the first event, the supervisory information, and the administrative information.

In some embodiments, the computing platform may establish, via the communication interface, a fourth connection to a social media computing device. While the fourth connection is established, the computing platform may receive, via the communication interface, from the social media computing device, subordinate user segment trends associated with the first event. The algorithm, when executed, may cause the computing platform to compare the information defining the first event, the supervisory information, and the subordinate user segment trends.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

There is an omnipresent need for educating young adults and adolescents approaching adulthood with respect to the management of funds. Aspects of the disclosure relate to systems for interactively monitoring spending of such individuals, such as a dependent child or other person ("subordinate user") under the care of a parent or guardian ("supervisory user"). A system may monitor the purchasing activity of a subordinate user and receive real-time data (e.g., pricing and availability) regarding a purchase desired by the subordinate user. Pricing data and availability for a desired product may be acquired and monitored, for example, directly from merchants' websites and/or from other online wholesalers, retailers, auctioneers, consignors, and/or service providers. The system may assist the subordinate user not only in efficiently completing the transaction at hand, but also in educating the subordinate user with respect to budgeting and managing funds.

Figure 1A:
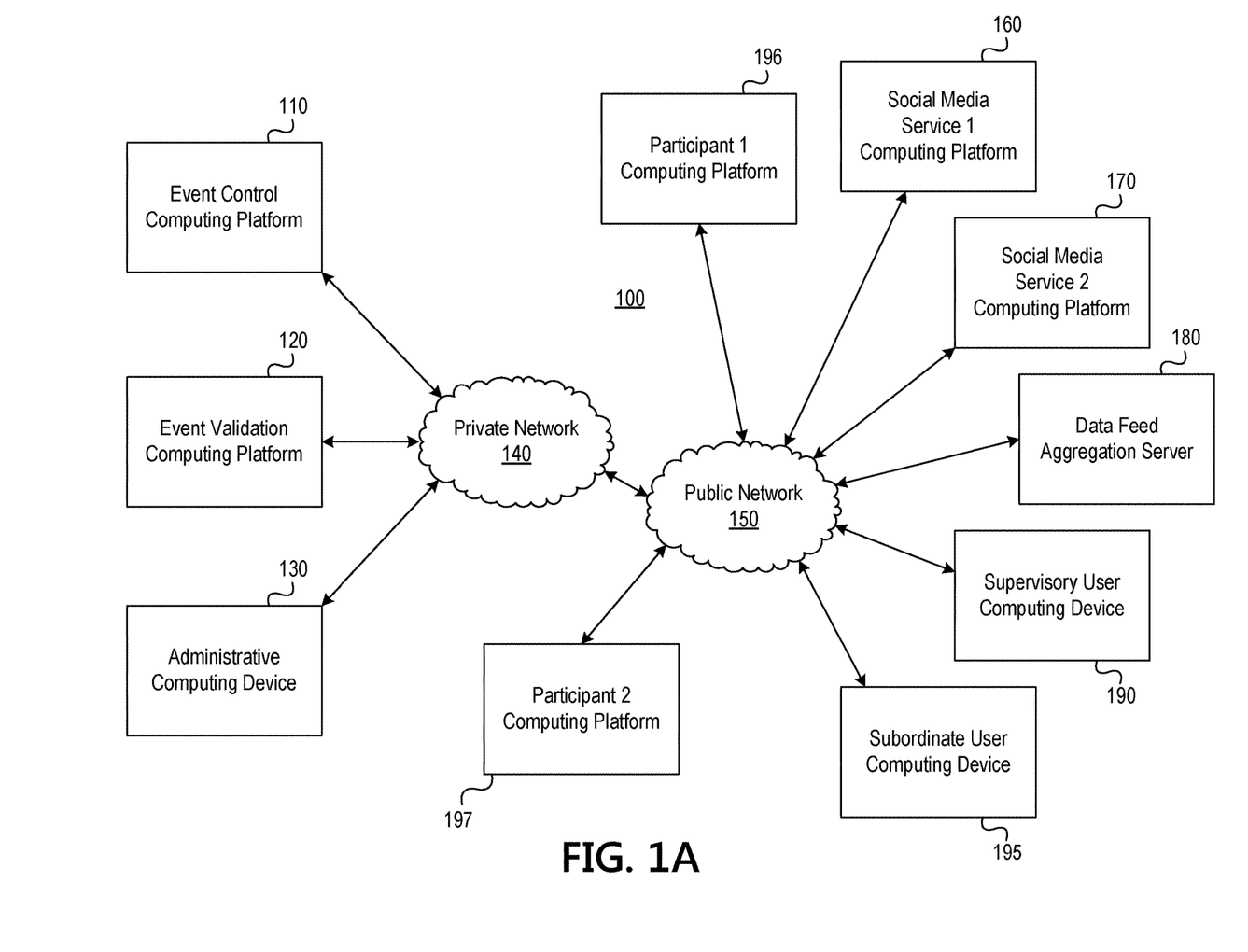
FIGS. 1A and 1B depict an illustrative computing environment for validating and controlling events executed across multiple computing platforms and devices in accordance with one or more example embodiments.
Figure 1B:
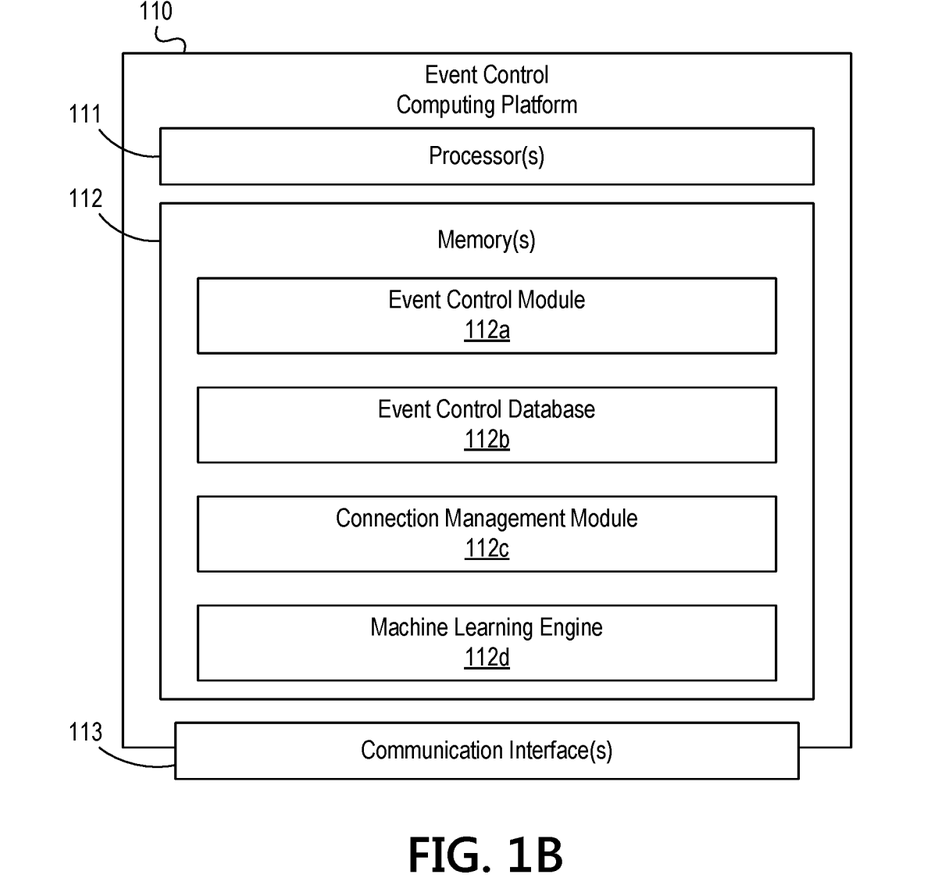

FIGS. 1A and 1B depict an illustrative computing environment for validating and controlling events executed across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, an event validation computing platform 120, an administrative computing device 130, a private network 140, a public network 150, a first social media service computing platform 160, a second social media service computing platform 170, a data feed aggregation server 180, a supervisory user computing device 190, a subordinate user computing device 195, a first participant computing platform 196, and a second participant computing platform 197.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event validation operations and event control operations across multiple computer systems and devices in computing environment 100.

Event validation computing platform 120 may include one or more computing devices configured to validate events based on event data received from event control computing platform 110 and/or from other sources. For example, event validation computing platform 120 may receive, from event control computing platform 110 and/or one or more other systems, event information defining one or more events to be executed in computing environment 100, and event validation computing platform 120 subsequently may authorize and/or otherwise validate the one or more events to be executed in computing environment 100, so as to allow the events to proceed and/or otherwise be executed. In some instances, the one or more events may correspond to one or more financial transactions that have been requested by one or more computing devices, such as supervisory user computing device 190 and/or subordinate user computing device 195, and event validation computing platform 120 may evaluate and/or selectively authorize the requested transactions based on information stored and/or maintained by event validation computing platform 120 (e.g., such as financial account information, account balance information, transaction history information, and/or account rules) and/or based on information received from event control computing platform 110 (e.g., such as user-specific transaction rules, account-specific transaction rules, user-specific trends information, user-segment trends information, and/or other information) and/or one or more other systems.

Administrative computing device 130 may be a desktop computer, laptop computer, workstation, or other computing device that is configured to be used by an administrative user, such as a network administrator associated with an organization operating event control computing platform 110 and/or event validation computing platform 120.

Social media service computing platform 160 may include one or more computing devices configured to host a first social media service (which may, e.g., be provided by an organization different from the organization operating event control computing platform 110 and/or event validation computing platform 120). In some instances, social media service computing platform 160 may maintain user profile information for various users of the first social media service, provide user interfaces associated with the first social media service to various user devices (e.g., supervisory user computing device 190, subordinate user computing device 195), and provide activity feed data to other systems and/or devices included in computing environment 100, such as event control computing platform 110, event validation computing platform 120, data feed aggregation server 180, and/or the like. For instance, social media service computing platform 160 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Social media service computing platform 170 may include one or more computing devices configured to host a second social media service (which may, e.g., be provided by an organization different from the organization operating event control computing platform 110 and/or event validation computing platform 120). Additionally, the second social media service may be different from the first social media service (e.g., the second social media service may be provided by an organization different from the organization providing the first social media service). In some instances, social media service computing platform 170 may maintain user profile information for various users of the second social media service, provide user interfaces associated with the second social media service to various user devices (e.g., supervisory user computing device 190, subordinate user computing device 195), and provide activity feed data to other systems and/or devices included in computing environment 100, such as event control computing platform 110, event validation computing platform 120, data feed aggregation server 180, and/or the like. For instance, social media service computing platform 170 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Data feed aggregation server 180 may include one or more computing devices configured to aggregate data feeds from various source systems (e.g., social media service computing platform 160, social media service computing platform 170, and/or other sources) and/or communicate data feeds to various destination systems (e.g., event control computing platform 110). In some instances, data feed aggregation server 180 may receive social media activity feed data from various social media platforms (e.g., social media service computing platform 160, social media service computing platform 170), merchant offer data from various merchant platforms (e.g., defining one or more merchant-specific offers that may be redeemable by customers at such merchants), and/or other activity data and/or content from other sources, and data feed aggregation server 180 may aggregate any and/or all of the received data to produce an aggregated data feed. Subsequently, data feed aggregation server 180 may communicate and/or otherwise provide the aggregated data feed to one or more destination systems, such as event control computing platform 110, so as to enable one or more functions provided by event control computing platform 110 (e.g., such as social-media-enabled financial-transaction functions). In some instances, the aggregated data feed may be communicated by data feed aggregation server 180 to event control computing platform 110 via a secure and/or encrypted communications link established between event control computing platform 110 and data feed aggregation server 180. FIG. 1A illustrates two merchant platforms as a first participant computing platform 196 and a second participant computing platform 197. In some instances, a larger number of participant computing platforms may be present, depending on the number of merchants offering a particular product of interest.

Supervisory user computing device 190 may be a desktop computer, laptop computer, workstation, or other computing device that is configured to be used by a supervisory user. Subordinate user computing device 195 may be a desktop computer, laptop computer, workstation, or other computing device that is configured to be used by a subordinate user. In some arrangements, the supervisory user may be a parent and the subordinate user may be a teen or other minor supervised by the parent. For instance, the user of supervisory user computing device 190 may utilize supervisory user computing device 190 to define one or more rules (e.g., such as spending limits, transaction approval conditions, and/or the like) for the user of subordinate user computing device 195. In addition, as the user of subordinate user computing device 195 utilizes subordinate user computing device 195 and/or one or more other systems and/or devices to request transactions, event control computing platform 110 and/or event validation computing platform 120 may selectively authorize such transactions based on rules received from supervisory user computing device 190 and/or defined by the user of supervisory user computing device 190 and/or based on other factors and/or rules.

Computing environment 100 also may include one or more networks, which may interconnect one or more of event control computing platform 110, event validation computing platform 120, administrative computing device 130, social media service computing platform 160, social media service computing platform 170, data feed aggregation server 180, supervisory user computing device 190, and subordinate user computing device 195. For example, computing environment 100 may include private network 140, which may be owned and/or operated by a specific organization and/or which may interconnect one or more systems and/or other devices associated with the specific organization. For example, event control computing platform 110, event validation computing platform 120, and administrative computing device 130 may be owned and/or operated by a specific organization, such as a financial institution, and private network 140 may interconnect event control computing platform 110, event validation computing platform 120, administrative computing device 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect social media service computing platform 160, social media service computing platform 170, data feed aggregation server 180, supervisory user computing device 190, subordinate user computing device 195, and/or various other systems and/or devices.

In some arrangements, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may be any type of computing device capable of receiving a user interface, receiving input via the user interface, and communicating the received input to one or more other computing devices. For example, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113, and event control computing platform 110 may exchange data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event validation operations and event control operations across multiple computer systems and devices in computing environment 100 and perform other associated functions, as discussed in greater detail below. Event control database 112b may store information used by event control computing platform 110 in orchestrating event validation operations and event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 and/or to manage and/or otherwise control the exchanging of data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

First participant computing platform 196 and second participant computing platform 197 may be associated directly with merchants such as product manufacturers, wholesalers, or retailers, for example, or alternatively may be various other types of platforms offering goods and/or services (referred to herein collectively as "products"), such as auction or consignment type platforms. In some example embodiments, when a subordinate user adds a product to his or her "wishlist," event control computing platform 110 may transmit a request and thereafter receive pricing and availability information from a plurality of sources, as illustrated in FIG. 1A as first participant computing platform 196 and second participant computing platform 197. The data feed aggregation server 180 may aggregate and sort pricing information, e.g., from lowest to highest. Rules may be established to ignore participants whose pricing is above a maximum value assigned by the subordinate user or supervisory user, or which, for example, is in excess of an average selling price for the market.

Upon receiving information from the subordinate user computing device 195, the supervisory user computing device 190, and the first participant computing platform 196, the event control computing platform 110 may execute an algorithm for comparing the information defining the first event, the supervisory information, and the first participant information. The algorithm may include a comparison of the price offered by the first participant to a target price selected by the subordinate user. The algorithm also may compare any amount that the subordinate user has in dedicated savings toward the product and the offer price. The algorithm also may compute whether the combined amount of subordinate user savings and funds available for borrowing from the supervisory user, would be sufficient to execute the purchase at that time. The comparison of the offer price and the target price may be a primary consideration. For example, if the offer price reaches or falls below the target price, the algorithm may return a result that causes the event control computing platform 110 to transmit a notification to the subordinate user computing device 195 and/or the supervisory user computing device 190 without regard to any other factors. If the offer price is more than a defined amount (e.g., 5% or 10%) above the target price, the algorithm may then compare the remaining factors, e.g., amount in dedicated savings and amount available for borrowing from supervisory user. If the subordinate user has reached a savings goal, the event control computing platform 110 may then determine whether the amount available for borrowing combined with the dedicated savings is sufficient to execute the purchase. If the combined amount is sufficient, the event control computing platform 110 may transmit a notification to the subordinate user computing device 195 and/or the supervisory user computing device 190.

In some aspects, a system may provide feedback to a subordinate user and/or a supervisory user regarding timing to make a purchase. Timing of the purchase may be influenced by such factors as the amount of dedicated savings that the subordinate user has accumulated toward the purchase, changes in the sale price, and so forth. In some aspects, known variables such as seasonal price changes may be factored in to appropriately select timing of purchases to help reduce overall expenditures. Information concerning seasonal price changes and/or other business rules may be provided by the administrative computing device 130. In some examples, rules provided by the administrative computing device 130 may result in a recommendation of delaying a purchase where the price of a product is likely to be reduced during an approaching season. In other examples, rules provided by the administrative computing device 130 may result in a recommendation of an alternative source(s) for the product, e.g., the product may be deeply discounted if purchased on Black Friday from a particular bricks-and-mortar retailer(s).

The event control computing platform 110 or the supervisory user computing device 190 may generate rules that the supervisory user may establish or select from that are aimed at assisting the subordinate user in making purchases and managing assets. The supervisory user computing device 190 may be configured to provide read-only access to an account stored on the subordinate user computing device 195 or, depending on the level of oversight desired, may allow some degree of control to make changes to the subordinate user's account and/or user interface. When the supervisory user loans funds to the subordinate user in order to complete a purchase, the event control computing platform 110 may configure the supervisory user interface and the subordinate user interface to include information with respect to amounts owed, payment schedules, interest, and other conditions of the loan. The subordinate user may have the ability to transfer funds to the supervisory user through the user interface (which may, e.g., be generated by event control computing platform 110 and/or displayed by subordinate user computing device 195), for instance, as loan payments or for other purposes.

In some aspects, event control computing platform 110 may generate instructions that result in the subordinate user computing device 195 being configurable to allow the subordinate user to set aside funds toward a desired purchase, either in the form of dedicated savings or as a "layaway" type transaction. In the case of dedicated savings, the subordinate user computing device 195 may be configured to allow the subordinate user to allocate available funds within a single account between desired purchase(s) and other obligations. In some examples, funds may be earmarked by the subordinate user for particular purchases or obligations to assist the subordinate user in budgeting. In other examples, the subordinate user computing device 195 may be configured to allow funds to be parsed into discrete accounts or sub-accounts dedicated for specific purposes. The subordinate user interface may provide the ability to reallocate funds between the different categories or transfer funds between the different accounts or sub-accounts. In the case of a layaway type transaction, the subordinate user computing device 195 may be configured to allow funds to be directly transferred to a merchant as a down payment for purchase and, in some cases, also to fix a purchase price. The event control computing platform 110 or the subordinate user computing device 195 may provide instructions that, when executed, result in the subordinate user interface displaying information indicating the remaining amount owed and a target payment plan for completing the layaway purchase, which may include periodic automatic payments.

The event control computing platform 110 and/or the supervisory user computing device 190 may provide rules to help reduce the overall expenditure for a purchase. For example, if the event control computing platform 110 receives information from a participant computing platform 196 or 197 that the sale price of a desired item has been reduced to a prescribed amount (or by a prescribed fraction, for example), the event control computing platform 110 may transmit an inquiry to the supervisory user computing device 190 asking whether the supervisory user wishes to advance any funds needed to purchase "on margin" for the benefit of the subordinate user. In some examples, the event control computing platform 110 may establish rules for the event validation computing platform 120 to automatically execute a transaction upon a price reaching a target price or being reduced by a predetermined amount, thereby applying "limit order" techniques to non-security purchases. This way, the subordinate user may receive the benefit of a temporary reduction in sales price (e.g., "flash" sale) without needing to continuously monitor pricing information. If desired, such auto-execution rules may be used in combination with other criteria such as the amount of accrued savings toward the purchase. For example, the event control computing platform 110 and/or the supervisory user computing device 190 may establish rules that if a purchase price reaches or falls below a target price and the subordinate user's savings toward the purchased have reached at least a predetermined amount, then the event validation computing platform 120 may automatically transmit instructions to the participant computing platform 196 or 197 to execute the purchase.

In other aspects, the event control computing platform 110 may leverage machine learning to modify the algorithm used for comparing incoming information for a particular subordinate user. For example, the event control computing platform 110 may receive from the supervisory user computing device 190 and/or the subordinate user computing device 195, information regarding loan repayment information of the subordinate user. Upon receiving this information, the machine learning engine 112d may assign a positive event (e.g., +1) when a subordinate user makes a timely payment toward an existing loan and, for example, a significant positive event (e.g., +5) upon the subordinate user timely satisfying an entire loan obligation. The machine learning engine 112d may assign a negative event (e.g., −1) when a subordinate user makes a late payment toward an existing loan. The severity of the negative event may be increased as the delay in making a payment increases (e.g., −2, −3, and so on). At periodic intervals (e.g., quarterly, semi-annually, or annually), the event control computing platform 110 may execute an algorithm that aggregates the positive and negative events that occurred during the interval. In this example, the event control computing platform 110 may simply calculate the sum of the positive and negative events. The algorithm used for comparing information may be modified according to the information received from the subordinate user. For example, for a subordinate user whose "credit score" falls below a defined value (e.g., −5), the algorithm may be modified such that more stringent criteria (e.g., higher fraction of purchase price needed in savings and/or reduced spending limits) are used for determining whether notifications will be transmitted to the subordinate user computing device 195 and/or the supervisory user computing device 190 with respect to subsequent desired purchases. On the other hand, if a subordinate user acquires a "credit score" exceeding a defined value (e.g.,+5), then less stringent criteria may be used, e.g., lower fraction of purchase price needed in savings and/or increased spending limits for subsequent purchases. In addition to (or instead of) modifying the algorithm used for comparing incoming information, the event control computing platform 110 may transmit a notification to the supervisory user computing device 190 with the results of the calculation, which may be categorized into preset groups based on the result (e.g., excellent, good, marginal, or poor). The event control computing platform 110 may transmit an inquiry asking whether the supervisory user wishes to modify any of the criteria for subsequent purchases requested by the subordinate user, e.g., upward or downward adjustment to purchase limit, minimum amount of savings required, and/or maximum loan amount. If the calculation yields a result below a prescribed marginal level, the event control computing platform 110 may transmit an inquiry to the supervisory user computing device 190 asking whether additional limitations on the subordinate user should be imposed, e.g., disallowing new purchases or loans toward new purchases until an existing obligation(s) is satisfied or until the subordinate user's "credit score" improves.

In other examples, the algorithm used for comparing incoming information may be modified based on information received from a plurality of subordinate user computing devices 195. For example, the event control computing platform 110 may determine, based on information received from a plurality of subordinate user devices 195, that a significant number of subordinate users of the same segment (e.g., college students) are purchasing an educational item that is on the wishlist of a particular subordinate user. Such an event may cause the event control computing platform 110 to modify the criteria used for determining whether to transmit a notification to the subordinate user computing device 195 and/or the supervisory user computing device 190, such that a notification may be transmitted even when the original criteria are not met. Such a notification may inform the subordinate user and/or the supervisory user that many users of the same segment (e.g., college students) have purchased the item, and suggest considering this fact in deciding whether to reprioritize the wishlist item or execute a purchase at that time.

Modification of the algorithm used for comparing incoming information may result not only in changes of the timing of the event control computing platform 110 transmitting a notification to the subordinate user computing device 195 and/or the supervisory user computing device 190, but also other factors such as the frequency of transmitting notifications. For example, the event control computing platform 110 may transmit notifications more frequently to subordinate users who exhibit positive credit attributes and less frequently to subordinate users who exhibit negative credit attributes.

Figure 2:
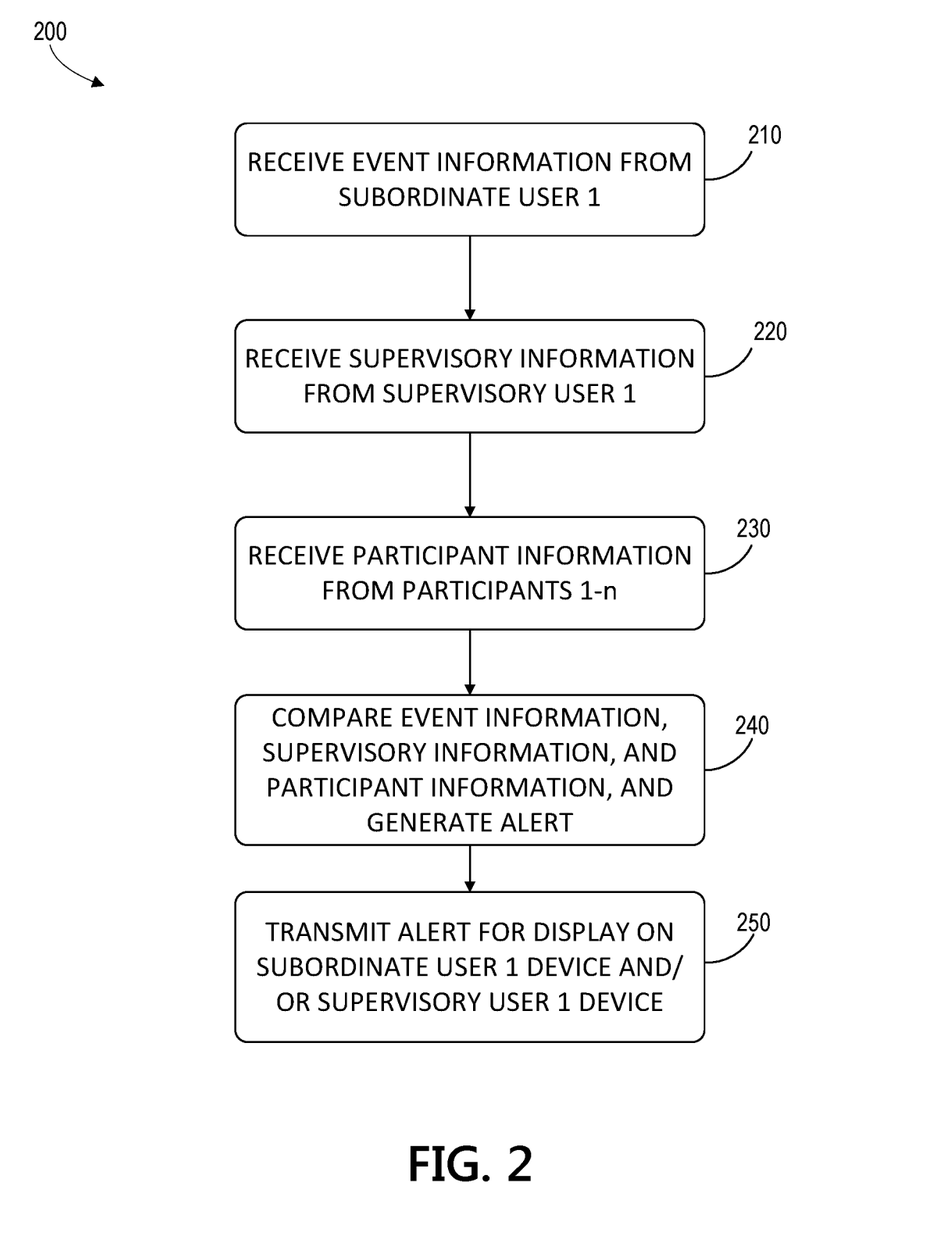
FIG. 2 depicts an illustrative event sequence for executing interactive supervisory controls in a computing environment in accordance with one or more example embodiments.

FIG. 2 illustrates an event sequence 200 in accordance with one or more example embodiments. At step 210, event control computing platform 110 receives event information from a first subordinate user device 195. The event information may identify a particular product that the subordinate user wishes to purchase, a price that the subordinate user is willing to pay for the product, and the amount of funds (if any) that the subordinate user currently has to put toward the purchase. At step 220, event control computing platform 110 receives supervisory information from a first supervisory user device 190. The supervisory information may include rules that set spending limits (either generally and/or for particular categories of products) and/or allow the subordinate user to execute a purchase upon predetermined criteria being satisfied, such as saving a threshold amount, e.g., 50%, 60%, 70%, 80%, or 90% of the purchase price, if a particular product becomes available for purchase at or below a target price, or some combination thereof. Supervisory information also may include rules for repayment of loans extended to the subordinate user, including maximum value (specific amount and/or maximum fraction of a purchase price) as well as the terms for repayment and interest rate (if any). At step 230, event control computing platform 110 receives participant information from one or more participant computing platforms 196, 197 associated with merchants offering the product. The participant information may include sale price and, in some examples, also the number of products currently in inventory. At step 240, event control computing platform 110 compares the event information, supervisory information, and participant information, and generates a formatted alert. At step 250, event control computing platform 110 transmits an alert(s) for display on the subordinate user device 195 and/or the supervisory user device 190. Examples of graphical user interfaces displayed by subordinate user devices and supervisory user devices will be described later with reference to FIGS. 4 and 5, respectively.

In accordance with one or more additional embodiments, event control computing platform 110 may collect information from a collection of subordinate user computing devices 195 and their respective supervisory user computing devices 190. Event control computing platform 110 may then execute an algorithm to aggregate this information and periodically transmit reports containing such macro-data to one or more participant computing platforms 196, 197. The algorithm may simply compile all of the information received, or it may filter information based on preselected criteria, for example, ignore wishlist items if the subordinate user does not have dedicated savings and has not identified a target price. Participants may benefit from the knowledge, for example, that a particular number of individuals are actively saving toward the purchase of a product and/or that supervisory users are willing to finance purchases or portions of purchases desired by subordinate users. In other aspects, participants may benefit from the knowledge of target pricing information assigned by prospective purchasers. Such information may provide the participant with objective information concerning the demand for a product at particular pricing points, and may assist the participant in planning various business activities such as manufacturing, warehousing, distribution, and pricing. In the case where a subordinate user and/or a supervisory user provided instructions to automatically execute a transaction and one of the participants meets the criteria for such transaction, event validation computing platform 120 may transmit an instruction to the appropriate participant computing platform 196 or 197 to execute the purchase, and a corresponding informational notification may be transmitted to the supervisory user computing device 190 and/or the subordinate user computing device 195.

Other previously described features may be used in connection with the one or more additional embodiments. For example, the administrative computing device 130 may transmit to the event control computing platform 110 business rules or historical information that may assist the participant in identifying or anticipating purchasing trends and behaviors. Social media service computing platform(s) 160 and/or 170 also may transmit to the event control computing platform 110 additional information concerning the anticipated demand for particular product(s) by particular subordinate user segments. The data feed aggregation server 180 and/or machine learning engine 112*d* may aggregate the various incoming information, and a machine learning dataset optionally may be used to refine the criteria used for aggregating the incoming information.

Figure 3:
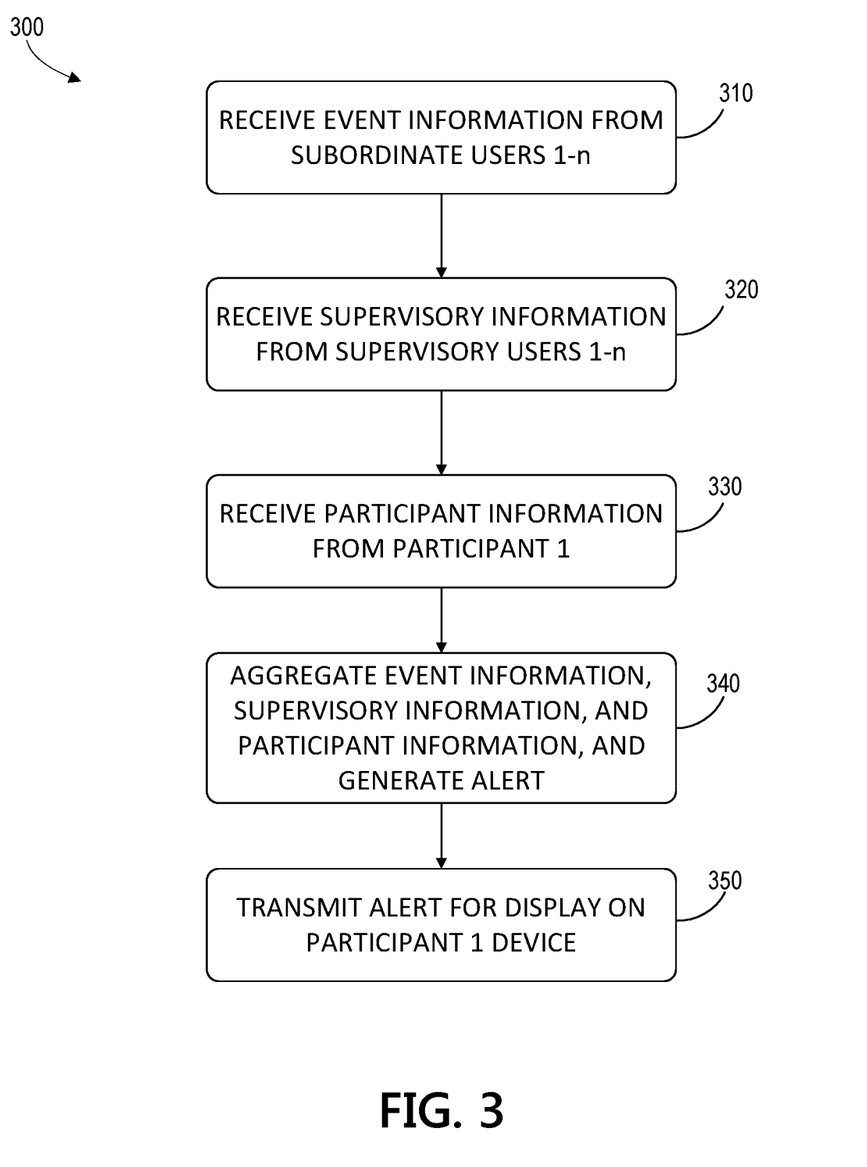
FIG. 3 depicts an illustrative event sequence for executing interactive supervisory controls in a computing environment in accordance with one or more additional example embodiments.

FIG. 3 illustrates an event sequence 300 in accordance with the one or more additional embodiments. At step 310, the even control computing platform 110 receives event information from a plurality of subordinate user computing devices 195. The event information may include aggregated information with respect to a particular product, the price(s) that the subordinate users are willing to pay for the product, and the amount of funds (if any) that the subordinate users currently have saved toward the purchases. At step 320, the event control computing platform 110 receives supervisory information from a corresponding plurality of supervisory user computing devices 190. The supervisory information may include aggregated information with respect to target pricing and offers of financing by the supervisory users. At step 330, the event control computing platform 110 receives participant information from a participant computing platform 196 or 197. At step 340, the data feed aggregation server 180 aggregates the event information, supervisory information, and participant information, and transmits the aggregated data to the event control computing platform 110, which generates a formatted alert. At step 350, the event control computing platform 110 transmits the alert for display on the participant computing platform 196 or 197. Examples of graphical user interfaces for participant computing platforms will be described later with reference to FIGS. 6A-6C.

In accordance with a variation of the one or more additional embodiments, one or more additional participants may interact with the event control computing platform 110, for example to facilitate participant-to-participant transactions and/or other participant-to-participant interactions. For example, with reference to FIG. 1A, event control computing platform 110 may receive participant information from both a first participant computing platform 196 and a second participant computing platform 197. Once the data feed aggregation server 180 aggregates the event information, supervisory information, and first participant information, event control computing platform 110 may transmit to the second participant computing platform 197 a formatted alert that may contain, e.g., a report summarizing the purchaser- (e.g., aggregated subordinate user/supervisory user) and supplier (e.g., first participant) information. With this aggregated information in hand, the second participant may, for example, seek to purchase a quantity of the products from the first purchaser at a discounted purchase price for resale, knowing that there are a number of willing purchasers of the product at particular pricing point(s). The event control computing platform 110 may transmit to the second participant computing platform 197 instructions for a user interface display that provides an option of sending a message to the first participant computing platform 196, e.g., to make an offer to purchase, a counteroffer, or a meeting request.

Figure 4A:
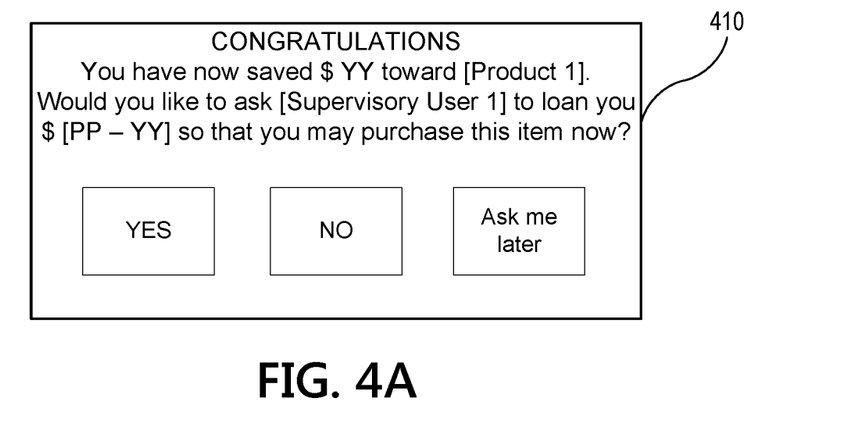
FIGS. 4A-4C depict example graphical user interfaces for subordinate user devices in accordance with one or more example embodiments.
Figure 4B:
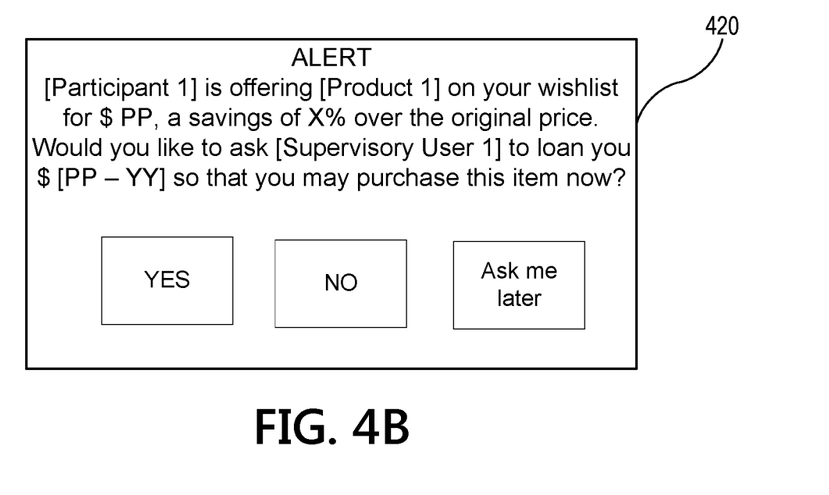
Figure 4C:
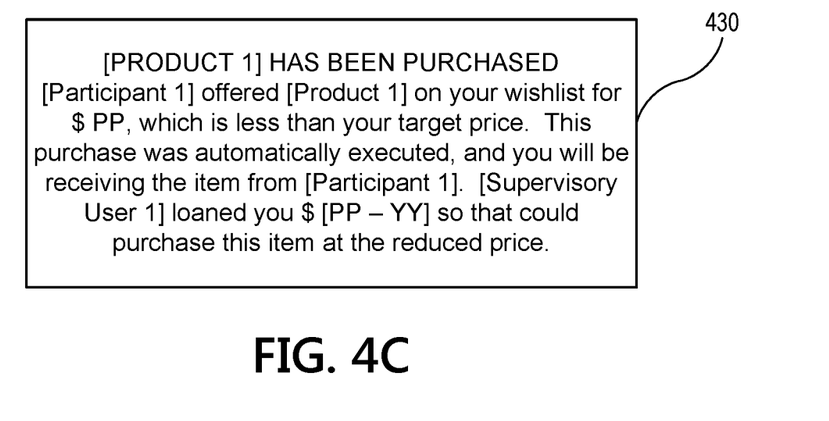

FIG. 4A-4C illustrate examples of graphical user interfaces for a subordinate user device 195. FIG. 4A shows a user interface 410 that alerts a subordinate user that a preset savings goal has been reached toward the purchase of a product. The user interface 410 may identify the product and include the amount saved ($ YY) and the lowest available purchase price ($ PP). If the amount saved is less than the purchase price, the user interface 410 may also include a query asking whether the subordinate user wishes to request a loan from the supervisory user for the difference needed ($ PP-YY). If the subordinate user selects "yes," event control computing platform 110 may transmit a request to the supervisory user computing device 190 containing the relevant information. If the subordinate user selects "no," event control computing platform 110 may cause a further inquiry to be displayed asking whether the product should be removed from the wishlist or retained on the wishlist. The user interface 410 may also include an option to "ask me later," which may cause the event control computing platform 110 to retransmit the inquiry to the subordinate user device 195 after a preset (or preselected) time period or upon the subordinate user reaching a subsequent savings goal.

FIG. 4B illustrates an example of a graphical user interface 420 that alerts a subordinate user that a product has become available for a reduced purchase price ($ PP). Event control computing platform 110 may automatically generate such an alert, e.g., upon the purchase price reaching or falling below a preselected target price or being reduced from the original sale price by a prescribed fraction, e.g., 10%, 15%, or 25%. If the amount saved ($ YY) is less than the purchase price ($ PP), event control computing platform 110 may cause the user interface 420 to include a query asking whether the subordinate user wishes to request a loan from the supervisory user for the difference needed ($ PP−YY). The subordinate user's responses to this query may be handled in a similar manner as described above with respect to FIG. 4A.

FIG. 4C illustrates an example of a user interface 430 that alerts a subordinate user that a purchase has been automatically executed in accordance with preselected rules or criteria. The user interface 430 may identify the product purchased, the merchant, and the sale price, and include a brief explanation that the transaction was automatically executed because the purchase price reached or fell below a target price. In the case where a supervisory user advanced funds to complete the transaction, the user interface 430 may also include an indication of the amount that was borrowed from the supervisory user to complete the purchase.

Figure 5A:
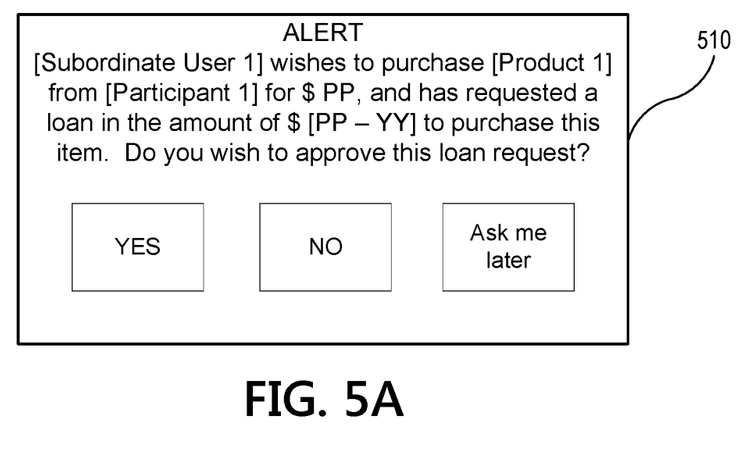
FIGS. 5A-5C depict example graphical user interfaces for supervisory user devices in accordance with one or more example embodiments.
Figure 5B:
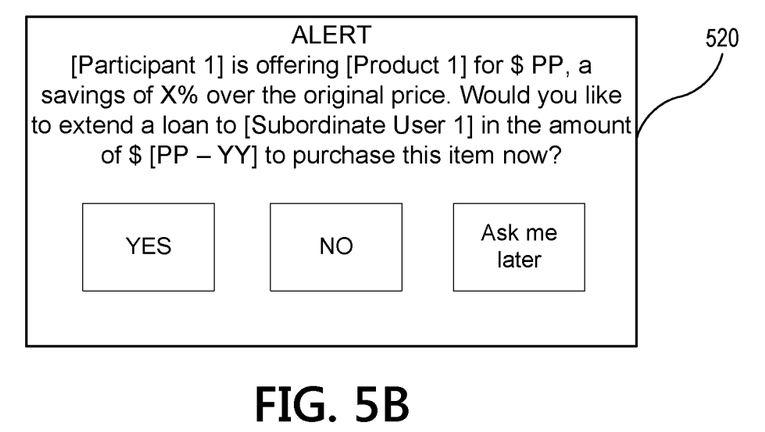
Figure 5C:
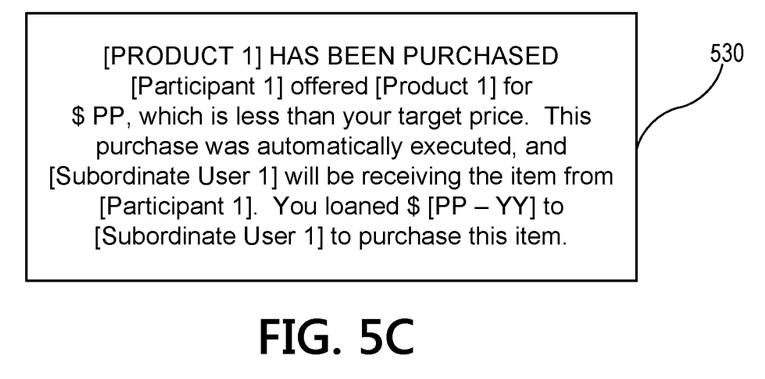

FIG. 5A-5C illustrate examples of graphical user interfaces for a supervisory user device 190. FIG. 5A shows a user interface 510 that alerts a supervisory user that a subordinate user has requested a loan for the purchase of a product. FIG. 5B shows an example of a user interface 520 that alerts a supervisory user that a product is being offered at a reduced sale price, e.g., at or below a target price. The user interfaces 510, 520 may identify the product and the loan amount requested, and may also include other information such as the amount saved by the subordinate user ($ YY) and the lowest offered purchase price ($ PP). The supervisory user may customize the user interfaces 510, 520 such that the alerts are generated automatically upon predetermined criteria being satisfied, such as subordinate user savings goals and/or participant pricing, or alternatively only upon the subordinate user requesting action from the supervisory user. The user interfaces 510, 520 may include a query asking whether the supervisory user wishes to extend a loan to the subordinate user in the amount requested ($ PP−YY). If the supervisory user selects "yes," the event control computing platform 110 may cause the requested funds to be automatically transferred to the subordinate user's financial account along with a memorandum that the funds are to be used for purchasing the requested item, and may also include any terms for repayment of the loan. Alternatively, upon supervisory user authorization, event control computing platform 110 may cause the combined dedicated savings from the subordinate user and the loan amount from the supervisory user to be transferred directly to the participant computing platform 196 or 197 in order to execute the purchase. If the supervisory user selects "no," event control computing platform 110 may transmit instructions to display a further inquiry asking whether the supervisory user wishes to send a message to the subordinate user, e.g., to explain why the request was denied. The user interfaces 510, 520 may also include an option to "ask me later," which if selected may cause event control computing platform 110 to retransmit the query to the supervisory user device 190 after a preset (or preselected) time period or upon the subordinate user reaching a subsequent savings goal.

FIG. 5C illustrates an example of a user interface 530 that alerts a supervisory user that a purchase has been automatically executed in accordance with preselected rules or criteria. The user interface 530 may identify the product purchased, the merchant, and the sale price, and include a brief explanation that the transaction was automatically executed because the purchase price reached or fell below a target price. In the case where a supervisory user advanced funds to complete the transaction based on pre-established rules, the user interface 530 may also include an indication of the amount that was loaned to the subordinate user to complete the purchase.

Figure 6A:
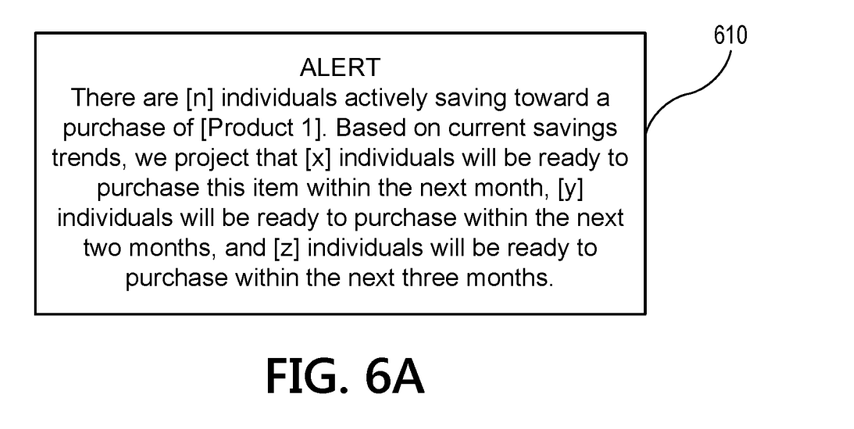
FIGS. 6A-6C depict example graphical user interfaces for participant computing platforms in accordance with one or more alternative embodiments.
Figure 6B:
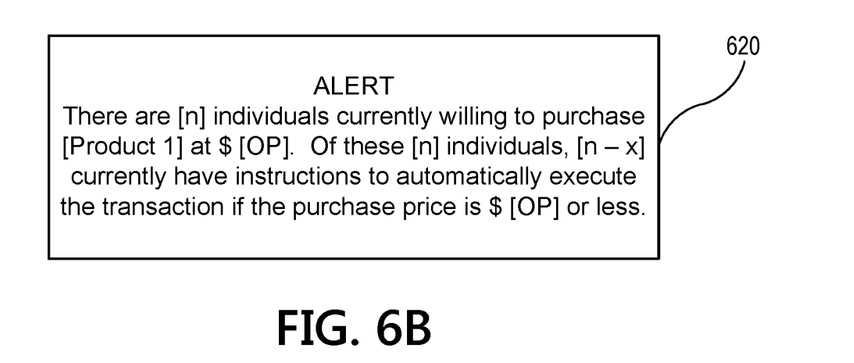
Figure 6C:
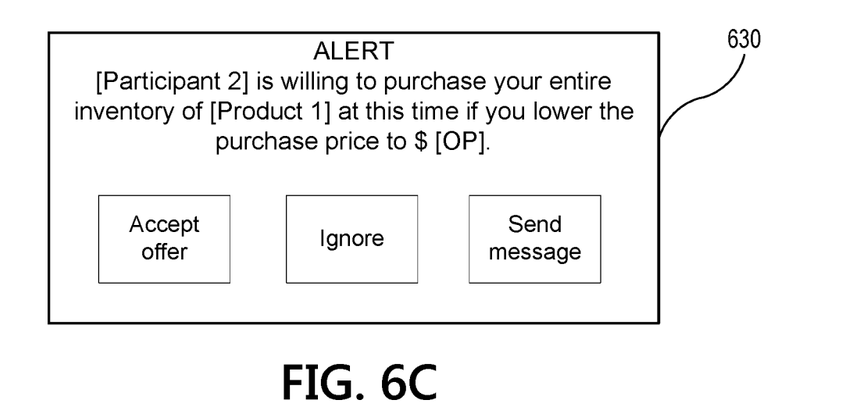

FIGS. 6A-6C illustrate examples of graphical user interfaces for a participant computing platform 196 or 197. FIG. 6A shows an example of an alert 610 that notifies a participant of the number of individuals (subordinate users) within the system who are actively saving toward the purchase of a product offered by the participant or, for example, who have added the product to a wishlist. The alert 610 may include additional information, such as projected timing of the sales based on the individuals' savings trends. FIG. 6B shows an example of an alert 620 which contains information concerning target price(s) or offer price(s) (OP) identified by prospective purchasers. The alert 620 may contain additional information, such as the number of individuals who have instructions to automatically execute a purchase if a certain target price is reached. The alerts 610, 620 may be generated and transmitted to the participant computing platform 196 or 197 automatically, for example upon a reaching a threshold number of prospective purchasers. Alternatively, the alerts 610, 620 may be generated periodically (e.g., weekly, biweekly, monthly, or quarterly) and/or as part of a larger report which may contain information for other products offered by the participant.

FIG. 6C shows an example of a participant alert 630 in accordance with the one or more alternative embodiments, e.g., as part of a participant-to-participant inquiry or transaction. Alert 630 as shown in generated upon a second participant computing platform 197 transmitting a request to a first participant computing platform 196 after receiving the aggregated subordinate user/supervisory user and first participant information as previously described. In the example shown in FIG. 6C, the aggregated information includes inventory information in addition to the current offer price of the first participant; and the second participant (e.g., wholesaler) is willing to purchase the entire inventory of the first participant at a specified offer price ($ OP). The notification 630 informs the first participant of the offer, and may provide options for the first participant to accept the offer, ignore (or refuse) the offer, or send a message to the second participant, e.g., to make a counteroffer.

The particular user interfaces shown in FIGS. 4-6 are merely illustrative and may be customized depending on user preferences as well as the type of device being used. For example, user interfaces on a smartphone or other telephone-enabled device may include an option to call another entity associated with the computing platform, e.g., subordinate user, supervisory user, and/or participant, instead of or in addition to the option of sending a message to the other entity.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish, via the communication interface, a first connection to a subordinate user computing device;
   while the first connection is established, receive, via the communication interface, from the subordinate user computing device, information defining a first event;
   establish, via the communication interface, a second connection to a supervisory user computing device;
   while the second connection is established, receive, via the communication interface, from the supervisory user computing device, supervisory information associated with the first event, the supervisory information including one or more rules governing authorization of delivery of the first event with respect to said subordinate user;
   establish, via the communication interface, a third connection to a first participant computing device;
   while the third connection is established, receive, via the communication interface, from the first participant computing device, first participant information associated with delivery of the first event;
   execute an algorithm for comparing the information defining the first event, the supervisory information, and the first participant information, wherein the algorithm determines at least whether delivery of the first event with respect to said subordinate user is authorized based on the supervisory information, and further determines that said subordinate user is in need of an advance as a condition precedent to obtain delivery of the first event, and generating a formatted alert based thereon;
   receive, via the communication interface, from the supervisory user computing device, the advance needed to facilitate delivery of the first event on behalf of the subordinate user; and
   based on receiving the advance needed to facilitate the delivery of the first event on behalf of the subordinate user, transmit to the subordinate user computing device, the supervisory user computing device, or both, the formatted alert which, when executed by the subordinate user computing device and/or the supervisory user computing device, causes a notification to be displayed on the subordinate user computing device, the supervisory user computing device, or both.

2. The computing platform of claim 1, wherein the memory stores additional computer-readable instructions that, when executed by the at least one processor, cause the computing platform to:
   establish, via the communication interface, fourth connections to a collection of participant computing devices;
   while the fourth connections are established, receive, via the communication interface, from the collection of participant computing devices, collective participant information associated with delivery of the first event;
   wherein the algorithm, when executed, compares the information defining the first event, the supervisory information, and the collective participant information.

3. The computing platform of claim 1, wherein the memory stores additional computer- readable instructions that, when executed by the at least one processor, cause the computing platform to:
   establish, via the communication interface, a fourth connection to an administrative computing device;

while the fourth connection is established, receive, via the communication interface, from the administrative computing device, administrative information associated with the first event;

wherein the algorithm, when executed, compares the information defining the first event, the supervisory information, the first participant information, and the administrative information.

4. The computing platform of claim 1, wherein the memory stores additional computer-readable instructions that, when executed by the at least one processor, cause the computing platform to:

establish, via the communication interface, a fourth connection to a social media computing device;

while the fourth connection is established, receive, via the communication interface, from the social media computing device, subordinate user segment trends associated with the first event;

wherein the algorithm, when executed, compares the information defining the first event, the supervisory information, the first participant information, and the subordinate user segment trends.

5. The computing platform of claim 1, wherein the memory stores additional computer-readable instructions that, when executed by the at least one processor, cause the computing platform to:

responsive to receiving the information defining the first event, based on a machine learning dataset, modify the algorithm for comparing the information defining the first event, the supervisory information, and the first participant information.

6. The computing platform of claim 5, wherein modifying the algorithm affects the timing of transmitting the formatted alert to the subordinate user computing device, the frequency of transmitting the formatted alert to the subordinate user computing device, or both.

7. The computing platform of claim 5, wherein the algorithm is modified based on historical information received from the subordinate user computing device.

8. The computing platform of claim 5, wherein the algorithm is modified based on information received from a plurality of subordinate user computing devices.

9. The computing platform of claim 1, wherein the memory stores additional computer-readable instructions that, when executed by the at least one processor, cause the computing platform to:

determine whether the information defining the first event, the supervisory information, and the first participant information satisfy predetermined automatic delivery criteria; and transmit a delivery instruction to the first participant computing device upon the information defining the first event, the supervisory information, and the first participant information satisfying the predetermined automatic delivery criteria.

10. A method, comprising:

at a computing platform comprising at least one processor, memory, and a communication interface:

establishing, via the communication interface, a first connection to a subordinate user computing device;

while the first connection is established, receiving, by the at least one processor, via the communication interface, from the subordinate user computing device, information defining a first event;

establishing, via the communication interface, a second connection to a supervisory user computing device;

while the second connection is established, receiving, via the communication interface, from the supervisory user computing device, supervisory information associated with the first event, the supervisory information including one or more rules governing authorization of delivery of the first event with respect to said subordinate user;

establishing, via the communication interface, a third connection to a first participant computing device;

while the third connection is established, receiving, via the communication interface, from the first participant computing device, first participant information associated with delivery of the first event;

executing an algorithm for comparing the information defining the first event, the supervisory information, and the first participant information, wherein the algorithm determines at least whether delivery of the first event with respect to said subordinate user is authorized based on the supervisory information, and further determines that said subordinate user is in need of an advance as a condition precedent to obtain delivery of the first event, and generating a formatted alert based thereon;

receiving, via the communication interface, from the supervisory user computing device, the advance needed to facilitate delivery of the first event on behalf of the subordinate user; and based on receiving the advance needed to facilitate the delivery of the first event on behalf of the subordinate user, transmitting to the subordinate user computing device, the supervisory user computing device, or both, the formatted alert which, when executed by the subordinate user computing device and/or the supervisory user computing device, causes a notification to be displayed on the subordinate user computing device, the supervisory user computing device, or both.

11. The method of claim 10, further comprising:
establishing, via the communication interface, fourth connections to a collection of participant computing devices;

while the fourth connections are established, receiving, via the communication interface, from the collection of participant computing devices, collective participant information associated with delivery of the first event;

wherein the algorithm, when executed, compares the information defining the first event, the supervisory information, and the collective participant information.

12. The method of claim 10, further comprising:
establishing, via the communication interface, a fourth connection to an administrative computing device;

while the fourth connection is established, receiving, via the communication interface, from the administrative computing device, administrative information associated with the first event;

wherein the algorithm, when executed, compares the information defining the first event, the supervisory information, the first participant information, and the administrative information.

13. The method of claim 10, further comprising:
establishing, via the communication interface, a fourth connection to a social media computing device;

while the fourth connection is established, receiving, via the communication interface, from the social media computing device, subordinate user segment trends associated with the first event;

wherein the algorithm, when executed, compares the information defining the first event, the supervisory information, the first participant information, and the subordinate user segment trends.

14. The method of claim 10, further comprising:
responsive to receiving the information defining the first event, based on a machine learning dataset, modifying the algorithm for comparing the information defining the first event, the supervisory information, and the first participant information.

15. The method of claim 14, wherein modifying the algorithm affects the timing of transmitting the formatted alert to the subordinate user computing device.

16. The method of claim 14, wherein modifying the algorithm affects the frequency of transmitting the formatted alert to the subordinate user computing device.

17. The method of claim 14, wherein the algorithm is modified based on historical information received from the subordinate user computing device.

18. The method of claim 14, wherein the algorithm is modified based on information received from a plurality of subordinate user computing devices.

19. The method of claim 10, further comprising:
determining whether the information defining the first event, the supervisory information, and the first participant information satisfy predetermined automatic delivery criteria; and
transmitting a delivery instruction to the first participant computing device upon the information defining the first event, the supervisory information, and the first participant information satisfying predetermined automatic delivery criteria.

20. One or more non-transitory computer-readable media storing instructions that, when executed by a computing platform comprising at least one processor, memory, and a communication interface, cause the computing platform to:
establish, via the communication interface, a first connection to a subordinate user computing device;
while the first connection is established, receive, via the communication interface, from the subordinate user computing device, information defining a first event;
establish, via the communication interface, a second connection to a supervisory user computing device;
while the second connection is established, receive, via the communication interface, from the supervisory user computing device, supervisory information associated with the first event, the supervisory information including one or more rules governing authorization of delivery of the first event with respect to said subordinate user;
establish, via the communication interface, a third connection to a first participant computing device;
while the third connection is established, receive, via the communication interface, from the first participant computing device, first participant information associated with delivery of the first event;
execute an algorithm for comparing the information defining the first event, the supervisory information, and the participant information, wherein the algorithm determines at least whether delivery of the first event with respect to said subordinate user is authorized based on the supervisory information, and further determines that said subordinate user is in need of an advance as a condition precedent to obtain delivery of the first event, and generating a formatted alert based thereon;
receive, via the communication interface, from the supervisory user computing device, the advance needed to facilitate delivery of the first event on behalf of the subordinate user; and
based on receiving the advance needed to facilitate the delivery of the first event on behalf of the subordinate user, transmit to the subordinate user computing device, the supervisory user computing device, or both, the formatted alert which, when executed by the subordinate user computing device and/or the supervisory user computing device, causes a notification to be displayed on the subordinate user computing device, the supervisory user computing device, or both.

* * * * *